United States Patent
Casci et al.

(10) Patent No.: US 12,476,035 B2
(45) Date of Patent: Nov. 18, 2025

(54) POWER INDUCTOR THERMAL MANAGEMENT

(71) Applicant: FORD GLOBAL TECHNOLOGIES, LLC, Dearborn, MI (US)

(72) Inventors: John Casci, Westland, MI (US); Moon Young Lee, Livonia, MI (US); Baoming Ge, Okemos, MI (US); Fan Wang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1013 days.

(21) Appl. No.: 17/547,847

(22) Filed: Dec. 10, 2021

(65) Prior Publication Data

US 2023/0187112 A1 Jun. 15, 2023

(51) Int. Cl.
*H01F 27/28* (2006.01)
*H01F 27/24* (2006.01)
*H02M 3/155* (2006.01)

(52) U.S. Cl.
CPC ............. *H01F 27/24* (2013.01); *H01F 27/28* (2013.01); *H02M 3/155* (2013.01)

(58) Field of Classification Search
CPC ...... H01F 27/24; H01F 27/28; H01F 27/2847; H01F 27/306; H01F 37/00; H01F 27/10; H01F 27/12; H01F 27/266; H01F 27/2823; H02M 3/155; H02M 1/0064; H02M 7/003; H02M 3/003; H02M 3/158

USPC ........................................................ 336/55–60
See application file for complete search history.

(56) References Cited

U.S. PATENT DOCUMENTS

| | | | |
|---|---|---|---|
| 5,438,182 A * | 8/1995 | Choi | H01F 17/04 336/212 |
| 9,581,234 B2 | 2/2017 | Sung et al. | |
| 2015/0310976 A1* | 10/2015 | Tong | H01F 27/18 336/60 |
| 2018/0159401 A1* | 6/2018 | Shi | H02K 5/02 |
| 2021/0151236 A1 | 5/2021 | Wang et al. | |
| 2021/0183563 A1 | 6/2021 | Maki | |
| 2021/0193374 A1* | 6/2021 | Kakizaki | H01F 27/303 |

FOREIGN PATENT DOCUMENTS

CN 110911128 A 3/2020

* cited by examiner

*Primary Examiner* — Shawki S Ismail
*Assistant Examiner* — Kazi S Hossain
(74) *Attorney, Agent, or Firm* — David B Kelley; Brooks Kushman P.C.

(57) ABSTRACT

A power inductor includes windings having a first coil defining an axially extending cavity and a core have at least first and second core segments extending axially through at least a portion of the cavity. The segments are radially spaced from each other to define a molding channel. Molding is disposed in the molding channel and configured to urge the first and second core segments radially apart such that outer surfaces of the core segments are in direct contact with inner surfaces of the coil.

20 Claims, 4 Drawing Sheets

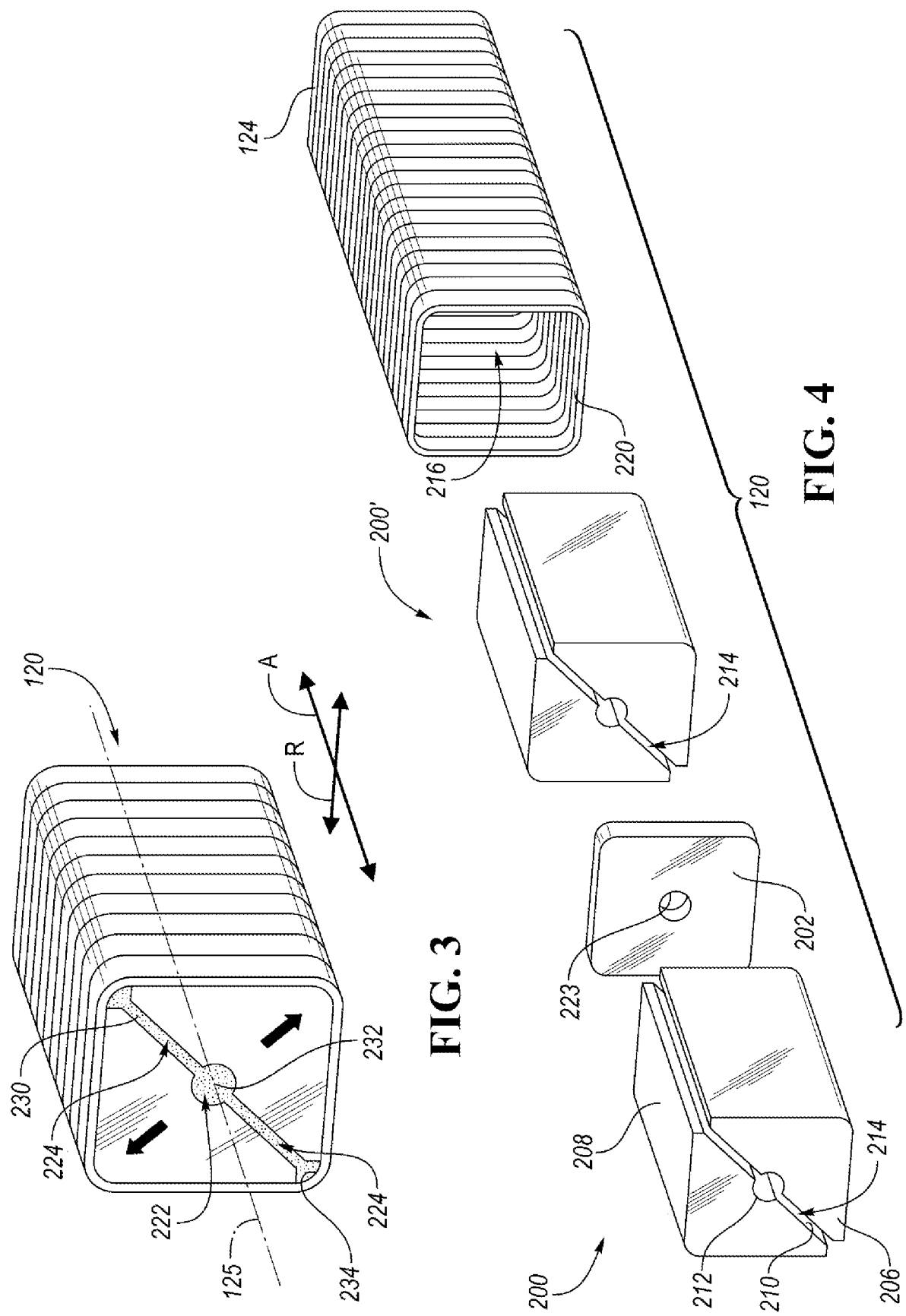

POWER INDUCTOR THERMAL MANAGEMENT

TECHNICAL FIELD

This disclosure relates to variable-voltage converters and more specifically to cooling power inductors.

BACKGROUND

Electric vehicles may include a voltage converter (e.g., a DC-DC converter) connected between the battery and the electric machine. Electric vehicles that have alternating current (AC) electric machines also include an inverter connected between the DC-DC converter and each electric machine. A voltage converter increases ("boosts") or decreases ("bucks") the voltage potential to facilitate torque capability optimization. The DC-DC converter includes an inductor (or reactor), switches and diodes. A typical inductor includes a conductive coil that is wound around a magnetic core.

SUMMARY

According to one embodiment, a power inductor includes windings having a first coil defining an axially extending cavity and a core have at least first and second core segments extending axially through at least a portion of the cavity. The segments are radially spaced from each other to define a molding channel. Molding is disposed in the molding channel and configured to urge the first and second core segments radially apart such that outer surfaces of the core segments are in direct contact with inner surfaces of the coil.

According to another embodiment, a power inductor includes a core having a first leg formed of at least two axially extending segments that overlap with each other and a coil disposed around the first leg and having inner surfaces in direct contact with the segments. Molding includes a central portion extending along an axial centerline of the first leg and disposed in a gap defined between the segments, wherein the central portion is configured to urge the segments radially outboard against the inner surfaces.

According to yet another embodiment, a variable-voltage converter includes first and second switching units and an inductor electrically connected to the switching units. The inductor includes windings having a first coil defining an axially extending cavity and a core having at least first and second core segments extending axially through at least a portion of the cavity, wherein the segments are radially spaced from each other to define a molding channel. Molding is disposed in the molding channel and is configured to urge the first and second core segments radially apart such that outer surfaces of the core segments are in direct contact with inner surfaces of the coil.

BRIEF DESCRIPTION OF THE DRAWINGS

FIG. 3 is a perspective view of a leg of the power inductor according to one or more embodiments.

FIG. 4 is an exploded perspective view of the leg of FIG. 3.

DETAILED DESCRIPTION

Figure 1:
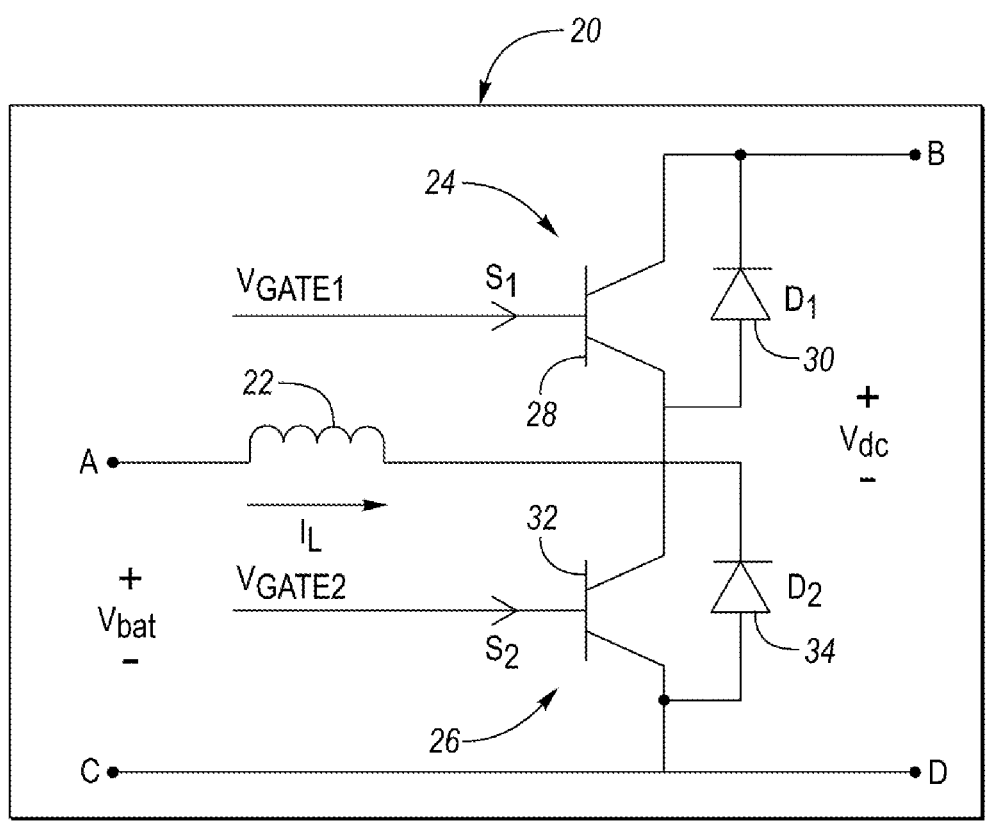
FIG. 1 is a circuit diagram of a variable-voltage converter.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made. The terms, connected, attached, etc., refer to directly or indirectly connected, attached, etc., unless otherwise indicated explicitly or by context.

Vehicles may include an electric powertrain that includes at least one traction motor for powering driven wheels. The traction motor may be powered by a traction battery. The battery is a high-voltage battery capable of outputting electrical power to operate the motor. The battery also receives electrical power from the motor when operating as a generator. A high-voltage bus electrically connects the battery to the motor. The vehicle may include one or more controllers for operating various components. The vehicle controllers generally include any number of microprocessors, ASICS, ICs, memory (e.g., FLASH, ROM, RAM, EPROM and/or EEPROM) and software code to co-act with one another to perform a series of operations. The controllers also include predetermined data, or "look-up tables" that are based on calculations and test data and stored within the memory. The controllers communicate with other vehicle systems and each other over one or more wired or wireless vehicle connections using common bus protocols (e.g., CAN and LIN).

The vehicle may include a DC-DC converter or variable voltage converter (VVC) and an inverter. The VVC and the inverter are electrically connected between the battery and the motor. The VVC may "boost" or increases the voltage potential of the electrical power provided by the battery and may "buck" or decreases the voltage potential of the electrical power provided to the battery. The inverter inverts the direct current (DC) power supplied by the battery (through the VVC) to AC power for operating the motor. The inverter also rectifies AC to DC.

The VVC is an assembly with components that may be mounted both inside and/or outside of a transmission or motor assembly of a vehicle. The VVC includes a power inductor. In one or more embodiments, the inductor is located within the transmission and/or motor housing. By mounting the inductor within a wet housing, e.g., transmission housing, the exposed surface area of the inductor may be directly cooled by transmission fluid which allows for improved thermal performance. The transmission includes additional structure for supporting the inductor while allowing the transmission fluid to flow through the structure to contact the exposed surface area.

The transmission may include a fluid, such as oil or automatic transmission fluid (ATF), for lubricating and cooling the gears located within the transmission chamber as well as any electric motors. The transmission housing is sealed to retain the fluid. The transmission may also include valves, pumps and conduits (not shown) for circulating the fluid through the cooling system. A heat exchanger or ATF cooler may be used to cool the fluid. The fluid may also be used to cool the inductor assembly. The transmission housing may include a sump that collects the fluid in the circulation system that is configured to draw fluid from the sump and redistribute that fluid onto components such as the inductor. As of explain below, the transmission may be configured to directly deliver transmission fluid onto the exposed windings in core of the inductor via one or more conduits. Splash cooling may also occur. Rotating elements (e.g., gears and shafts) may displace or "splash" fluid on other components.

Previous inductors typically included a bobbin inserted between the core and the coils. The bobbin structurally held the core segments and the coils together while also separating them from touching. In a subsequent manufacturing step, injection molding filled the gap between the core and the coils. This created a plastic barrier between the core and the coils. The plastic had a high thermal resistance blocking heat in the core from escaping to the coils where the cooling fluid is applied.

Referring to FIG. 1, a VVC 20 includes a power inductor 22. The VVC 20 also includes a number of switches and diodes. For example, the VVC 20 includes a first switching unit 24 and a second switching unit 26 for boosting the input voltage (Vbat) to provide output voltage (Vac). The first switching unit 24 includes a first transistor 28 connected in parallel to a first diode 30, but with their polarities switched (anti-parallel). The second switching unit 26 includes a second transistor 32 connected anti-parallel to a second diode 34. Each transistor 28, 32 may be any type of controllable switch (e.g., an insulated gate bipolar transistor (IGBT) or field-effect transistor (FET)). Additionally, each transistor 28, 32 is individually controlled by a controller. The inductor 22 is depicted as an input inductor connected in series between the battery and the switching units 24, 26. The inductor 22 generates magnetic flux when current is supplied. When the current flowing through the inductor 22 changes, a time-varying magnetic field is created, and voltage is induced. The VVC 20 may also include different circuit configurations (e.g., more than two switches).

Figure 2:
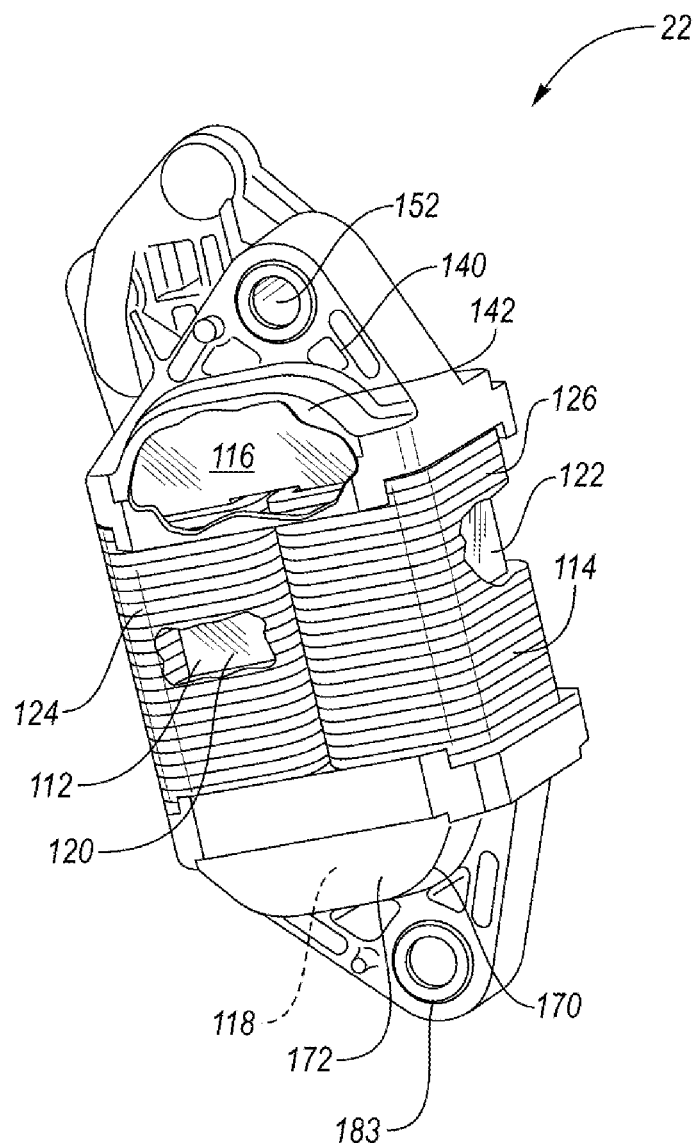
FIG. 2 is perspective view of a power inductor.

Referring to FIG. 2, the power inductor 22 includes a core 112 that may be formed as a dual "C" configuration. The core may be formed of multiple sections with spacers in between. The core 112 includes an upper end 116 and a lower end 118 that are each formed in a curved shape. The core 112 also includes a first leg 120 and a second leg 122 for interconnecting the end 116 to the end 118 collectively forming a ring-shaped core 112. The core 112 may be formed of a magnetic material that includes iron, such as an iron-silicon alloy powder, Ferrite, nanocrystal, or the like.

Conductors 114 in the form of a winding are wrapped on the core 112. For example, the conductors include two adjacent tubular coils wound helically to form a first coil 124 and a second coil 126. The coils may be formed using a rectangular (or flat) type conductive wire by an edgewise process. The conductors 114 may be metal, such as copper or aluminum, and may be coated in an electrically insulative material. Input and output leads of the winding extend to connect to other components. The conductors 114 of the coils may be a single continuous wire or separate and joined electrically by a busbar or jumper.

The power inductor 22 includes an upper end cover or cap 140 that is secured onto the upper end of the core 112. The end cover 140 may be molded with the core 112 and conductor 114. The end cover 140 includes a curved portion 142 that is configured to receive the curved upper end 116 of the core 112. The end cover 140 may be substantially rectangular having opposing short sides that are interconnected by opposing long sides. The end cover 140 may further have mounts 152 that are configured to attach with a housing of a vehicle powertrain such as within a transmission housing. The upper cover 140 may support electrical components such as busbars used to connect the power inductor 22 to the high-voltage traction battery and the VVC power electronics, for example.

The power inductor 22 further includes a lower end cover 170 secured onto the lower end of the core 112. The end cover 170 may be molded with the core 112 and conductor 114. The end cover 170 includes a curved portion 172 that is configured to receive the curved lower end 118 of the core 112. The end cover 170 may be substantially rectangular having opposing short sides that are interconnected by opposing long sides. The end cover 170 may further have mounts 183 that are configured to attach with a housing or other support structure.

The power inductor 22 may be disposed within a transmission or gearbox of the vehicle. Bolts or other fastener may extend through the mounts provided in the covers 140 and 170 to attach the power inductor 22 to the housing. The power inductor 22 may be cooled by a fluid. The fluid may be any dielectric fluid. For example, the fluid may be oil such as transmission fluid. The oil may be supplied to the inductor 22 by a circulation system. The oil may be spray, splashed, etc., onto the outer surface of the inductor 22 to provide cooling.

The power inductor 22 does not include a bobbin nor a plastic barrier between the core and the coils. Instead, the coils and the core are in direct contact with each other to facilitate thermal management of the inductor 22. Here, the heat can more easily travel from the core, to the coils, and into the fluid on the exterior of the coils.

Referring to FIGS. 3 and 4, the first leg 120 includes a plurality of sections 200 that are linearly stacked in the axial direction (A) with spacers 202 disposed therebetween. Each section 200 is formed of two or more core segments 206 that are individual pieces of the core 112. The segments 206 of a same section 200 are arranged adjacent to each other so that they overlap. In the illustrated embodiment, each section 200 includes two core segments 206 that are in the shape of generally triangular prisms. Each segment 206 includes a pair of outer sides 208 and an inner side 210. The inner side 210 defines a groove 212, which may be a semicircle. The segments 206 are positioned adjacent to each other with the inner sides 210 facing each other to form a generally rectangular section 200 that matches the cavity 216 defined by the coil 124. The segments 206 are radially spaced apart to form a gap 214. At least one addition section 200' is provided on the other side of the spacer 202. The addition section 200' has a same design as the section 200 and will not be discussed again for brevity.

The first leg 120 of the core is disposed within the cavity 216 of the coil 124 without the use of a bobbin or other insulative material. This allows the outer sides or surfaces 208 of the segments 206 to be disposed in direct contact with the inner surfaces 220 of the coil 124. To facilitate this, the injection-molding material is placed centrally in the gap 214 rather than around the perimeter of the core as was traditionally done. The central grooves 212 cooperate to define a central molding channel 222 that is located along the axial centerline 125 of the leg. The spacer 202 may include a hole 223 aligned with the central channel 222 to place the central channels of the sections 200, 200', etc. in fluid communication. The gap 214 also forms radial molding channels 224 that extend radially outward from the central channel 222. While the illustrated embodiment includes two segments per section, other arrangements are contemplated. For example, each section may include four core segments that are all spaced apart from each other to define gaps therebetween. Here, the gaps may form a central molding channel and four radially extending molding channels.

The second leg 122 includes a same or similar construction and will not be discussed again for brevity.

The inductor 22 may be assembled by first forming the conductors into the first and second coils. Next, the legs 120, 122 of the core are inserted into the cavities of the coils 124, 126. Once all of the individual components of the legs, e.g., segments and spacers, are correctly arranged within the cavities of the coils, injection molding may begin. The assembly may be placed into an injection-molding machine that injects injection-molding material (e.g., resin) into the molding channels defined between the core segments 206. The resin or molding material is injected axially through the central channel 222 and, from there, propagates radially outward through the radial channels 224. The spacer 202 may include a central hole 223 that connects the central molding channels 222 of the individual sections 200 in fluid communication. As the resin fills the gap 214 between the core segments 206, outward pressure is generated forcing the outer surfaces 208 of the core segments 206 into tight and direct contact with the inner surfaces of the coils. That is, the injection-molding material urges the core segments 206 radially outward from the centerline 125 and puts them into a state of compression between the coil and the injection-molding material. The resin cures to form molding e.g., plastic, 230 disposed in the interior of the legs. The molding 230 includes a central portion 232 extending along the axial centerline 125 of the leg and a radial portion(s) 234 extending radially from the central portion 232 to one of the inner surface(s) 220 of the coil. The injection molding process also forms the end covers 140, 170. The end covers and the molding 230 are integrally formed with each other. The molding 230 within the core 112 acts as bracing to help hold the end covers 140, 170 together. This, of course is just one example process.

Figure 5:
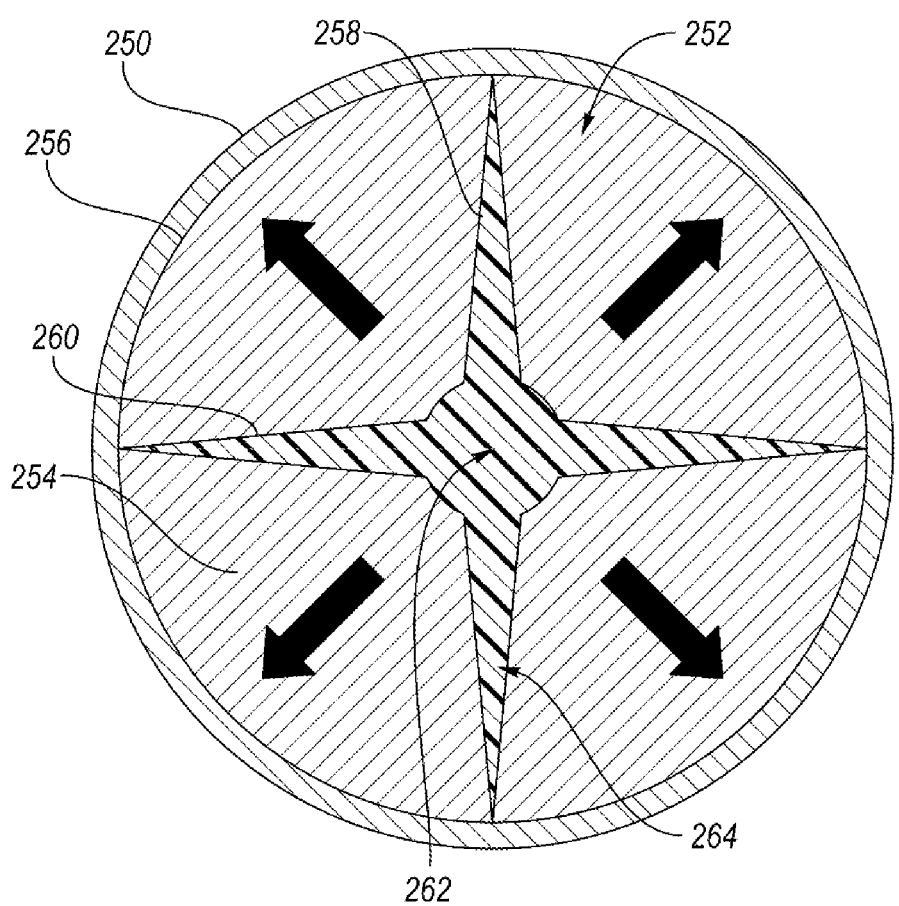
FIG. 5 is an end view of a leg of the power inductor according to another embodiment.

FIG. 5 illustrates an alternative embodiment having a circular coil 250. The core also includes a circular cross section—at least at the legs. In the illustrated embodiment, the leg 252 includes four core segments 254 in each section. Each of the core segments 254 includes an arcuate outer surface 256 and a pair of inner surfaces 258, 260. The inner surfaces of the core segments 254 are spaced apart from each other to form molding channels. The molding channels may include a central molding channel 262 and a plurality of radially extending channels 264 that extend from the central channel 262 towards the coil 250. As described above, resin is injected into the molding channels to urge the core segments 254 radially outward so that the outer surfaces 256 are in direct contact with the inner surface of the coil 250.

The above-described bobbin-less design allows the core heat to dissipate through the coils and subsequently to the outer environment (e.g., cooling oil and the air) with less thermal resistance than previous designs due to the elimination of the bobbin frame and injection-molded material between the core and the coils. With more efficient cooling, the chances of overheating are reduced leading to robust inductor performance.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A power inductor comprising:
   windings including a first coil defining an axially extending cavity;
   a core including at least first and second core segments extending axially through at least a portion of the cavity, the segments being radially spaced from each other to define a molding channel; and
   molding disposed in the molding channel and configured to urge the first and second core segments radially apart such that outer surfaces of the core segments are in direct contact with inner surfaces of the coil.

2. The power inductor of claim 1, wherein the molding channel includes a central axially extending passage and at least two radially extending passages.

3. The power inductor of claim 1, wherein the molding is plastic, and the core includes iron.

4. The power inductor of claim 1 further comprising a second coil defining a second axially extending cavity, wherein the core includes at least third and fourth core segments extending axially through at least a portion of the second cavity, the third and fourth segments being radially spaced from each other to define another molding channel, and wherein molding is disposed in the another molding channel and configured to urge the third and fourth core segments radially apart such that outer surfaces of the third and fourth core segments are in direct contact with inner surfaces of the second coil.

5. The power inductor of claim 4, wherein the core includes a first leg including at least the first and second core segments and a second leg including at least the third and fourth core segments, wherein the legs are interconnected by curved portions of the core.

6. The power inductor of claim 1, wherein the cavity includes four inner sides, and wherein each of the first and second core segments includes two outer sides in contact with associated ones of the inner sides of the cavity and an inner side in contact with the molding.

7. The power inductor of claim 1, wherein the coil includes a metal conductor and an insulator coating around the metal conductor.

8. The power inductor of claim 1, wherein the core further includes third and fourth core segments extending axially through a portion of the cavity, the third and fourth core segments being axially spaced from the first and second core segments and radially spaced from each other to define an additional portion of the molding channel, wherein the molding is configured to urge the third and fourth core segments radially apart such that outer surfaces of the third and fourth core segments are in direct contact with inner surfaces of the coil.

9. A power inductor comprising:
a core including a first leg formed of at least two axially extending segments that overlap with each other, wherein the segments cooperate to define a molding channel extending along an axial centerline of the first leg and including a gap defined between the segments;
a coil disposed around the first leg and having inner surfaces in direct contact with the segments; and
molding disposed in the molding channel and including a central portion extending along the axial centerline of the first leg and disposed in the gap defined between the segments, wherein the central portion is configured to urge the segments radially outboard against the inner surfaces.

10. The power inductor of claim 9, wherein the molding further includes a radial portion extending radially from the central portion to one of the inner surfaces.

11. The power inductor of claim 10, wherein the radial portion is disposed in a second gap between the two segments.

12. The power inductor of claim 9, wherein the segments are in a state of compression between the molding and the coil.

13. The power inductor of claim 9, wherein the core includes a second leg formed of at least two axially extending segments that overlap with each other, and further comprising:
a second coil disposed around the second leg and having inner surfaces in direct contact with the segments of the second leg; and
additional molding including a central portion extending along an axial centerline of the second leg and disposed in a gap defined between the segments of the second leg, wherein the central portion of molding in the second leg is configured to urge the segments of the second leg radially outboard against the inner surfaces of the second leg.

14. The power inductor of claim 13 further comprising an end cap molded to the core, wherein the end cap, the molding, and the additional molding are integrally formed.

15. The power inductor of claim 9, wherein the coil includes a metal conductor and an insulator coating around the metal conductor.

16. A variable-voltage converter comprising:
first and second switching units; and
an inductor electrically connected to the switching units, the inductor including:
windings including a first coil defining an axially extending cavity,
a core including at least first and second core segments extending axially through at least a portion of the cavity, the segments being radially spaced from each other to define a molding channel, and
molding disposed in the molding channel and configured to urge the first and second core segments radially apart such that outer surfaces of the core segments are in direct contact with inner surfaces of the coil.

17. The variable-voltage converter of claim 16, wherein the molding channel includes a central axially extending passage and at least two radially extending passages.

18. The variable-voltage converter of claim 16, wherein the cavity includes four inner sides, and wherein each of the first and second core segments includes two outer sides in contact with associated ones of the inner sides of the cavity and an inner side in contact with the molding.

19. The variable-voltage converter of claim 16, wherein the coil includes a metal conductor and an insulator coating around the metal conductor.

20. The variable-voltage converter of claim 16, wherein the inductor further includes an end cap molded to the core, wherein the end cap and the molding are integrally formed.

* * * * *